Oct. 23, 1934.  C. H. VAN HASSELT  1,978,238
TUMBLER
Filed July 9, 1932   3 Sheets-Sheet 1

INVENTOR
CHARLES H. VAN HASSELT
BY
Oscar A. Geiry
ATTORNEY

Oct. 23, 1934.   C. H. VAN HASSELT   1,978,238
TUMBLER
Filed July 9, 1932   3 Sheets-Sheet 2

INVENTOR
CHARLES H. VAN HASSELT
BY
Oscar A. Geier
ATTORNEY

Oct. 23, 1934.  C. H. VAN HASSELT  1,978,238
TUMBLER
Filed July 9, 1932  3 Sheets-Sheet 3

INVENTOR
CHARLES H. VAN HASSELT
BY
Oscar A. Geier
ATTORNEY

Patented Oct. 23, 1934

1,978,238

UNITED STATES PATENT OFFICE 1,978,238

TUMBLER

Charles H. van Hasselt, Manggar, Billiton, Dutch East Indies, assignor to N. V. Gemeenschappelyke Mynbouwmaatschappy Billiton, The Hague, Netherlands, a company of the Netherlands Application July 9, 1932, Serial No. 621,627 In the Netherlands July 30, 1931

3 Claims. (Cl. 74—243)

Heavy chains, such as used in dredgers, digging apparatus, elevators etc. run over a multisided, for instance six sided drum, the so-called tumbler. It is well-known to anyone skilled in the art that in a dredger the circumferential length of the tumbler decreases and the pitch of the chain increases by wear and tear, whereby the smooth running of the chain is impaired. With a view thereto it is ordinary practice to provide the faces of the tumbler with suitable wearing plates to restore normal running conditions. As a matter of course, the thickness of said plates should be responsive to the increase of the pitch of the chain.

In dredgers, the central portion of the tumbler is ordinarily provided, along the edges, with sprockets adapted to engage the chain joints so as to transmit by far the greater part of the pull on the chain. These sprockets, and especially the bearing faces thereof, are the parts most liable to wear and tear, so that the aforesaid wearing plates, which also extend over the sprockets, wear out almost exclusively where they cover the sprockets and the edge portions of the tumbler.

The manner in which a worn chain and a worn tumbler cooperate has been illustrated in Fig. 1 of the drawings. The six sided tumbler 1 is provided with sprockets 2. The chain 3, the hinge joints of which are assumed to be seriously worn out, is engaged exclusively by the bearing faces of the sprockets and by the leading edge portions of the tumbler faces, the consequence being that the portions 4 have worn away. The specific surface pressure is exceedingly high, so that even very hard material, such as manganese steel, is first squeezed and thereafter rapidly wears off.

It is the principal object of my present invention to minimize said wear. With this object in view I suggest to provide the tumbler with rib like members which are adjustable, for instance pivotally mounted, about axes in parallel relation with the axis of the tumbler. The edge portions of the bearing faces of these adjustable members cannot wear off more rapidly than do other portions thereof, since said members engage the chain with their entire bearing surface, which automatically adapts itself to the chain links. It will thus be understood that the specific surface pressure will be very much lower than with the usual construction. Moreover, the provision of these adjustable ribs results in the circumferential length of the circumscribed hexagon increasing in accordance with the pitch of the chain. Fig. 1 clearly shows that the inner faces of the chain links form a hexagon which is larger than the hexagonal cross section of the drum. The bearing faces of the adjustable ribs always follow the chain in such a manner as to offer a maximum of supporting area to the three links engaged by the tumbler.

The drawings further illustrate some embodiments of the invention.

Figure 1:
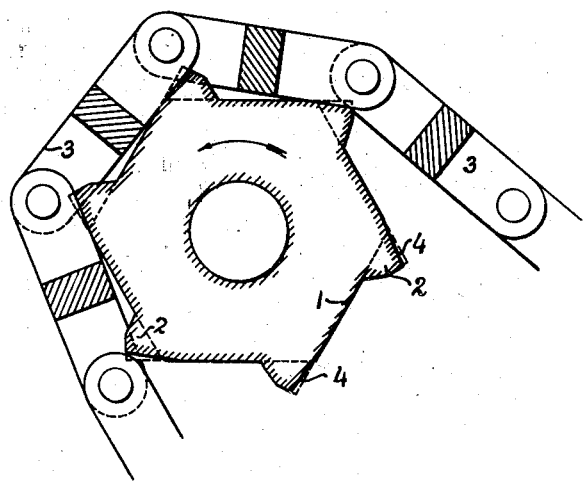
Figure 2:
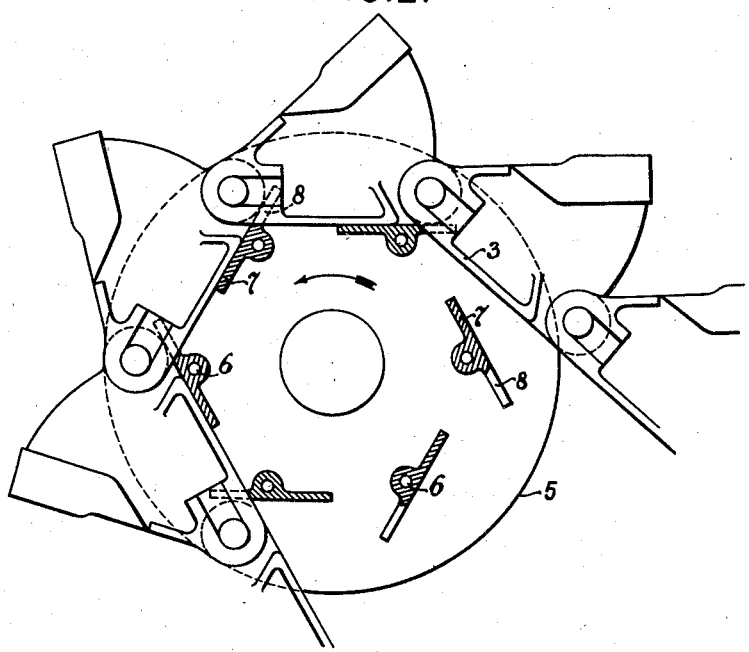
Fig. 2 is a diagrammatic view showing the manner in which the chain is supported by pivotally mounted ribs, the axes of rotation of which form the edges of a regular six sided prism.

In accordance with Fig. 2, shafts 6, the axes of which form the edges of a regular six sided prism, are mounted between flanges 5 and each carry a rib freely rotatable thereon. Each rib comprises a flat portion 7 indicated by hatching and extending from the inner face of the one flange 5 to that of the other, and a central extension 8 forming a sprocket. Under the action of the pressure exerted by the bucket chain 3, the ribs are free to angularly adjust themselves about their shafts 6 and snugly fit against the chain links, so as to afford the maximum of bearing area.

Figure 3:
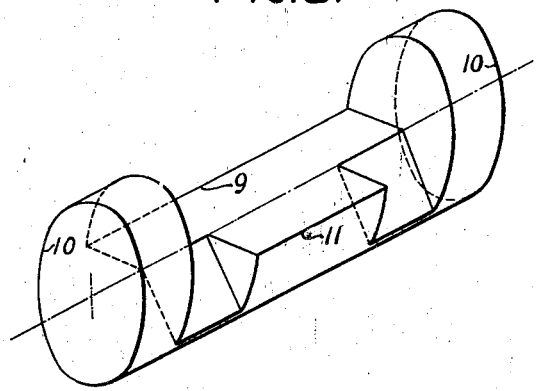
Fig. 3 is a perspective view of a pivotal rib as used in the construction shown in Figs. 5 and 6.
Figure 5:
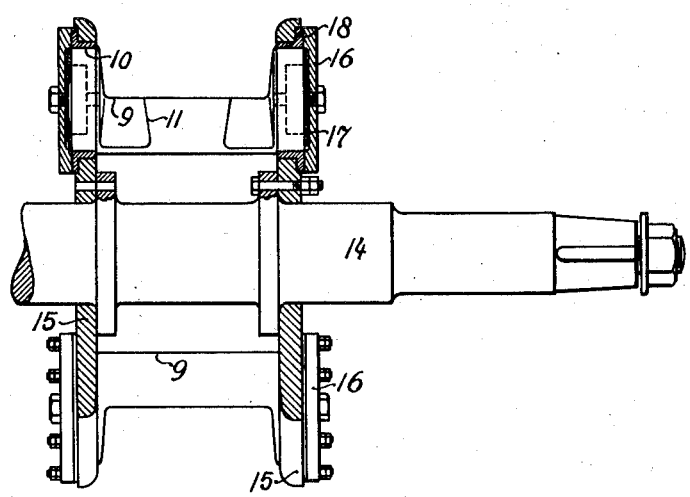
Figs. 5 and 6 are an axial sectional view and an end view, respectively, of a complete tumbler.
Figure 6:
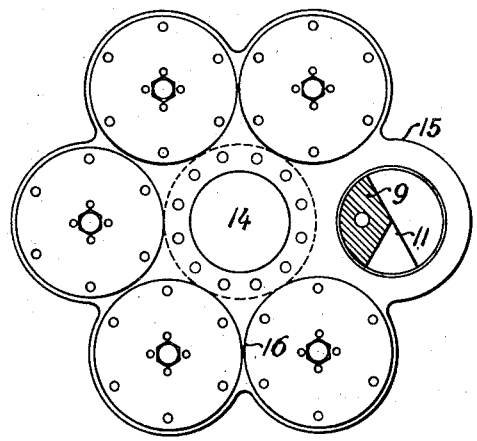

In Figs. 3, 5 and 6, each rib consists of a bar 9 provided at either end with a cylindrical trunnion 10 and in its central portion with a sprocket 11. Secured to the shaft 14 of the tumbler are suitably spaced flanges 15 each having six equally spaced cylindrical bearings with gun metal bushes 18 for receiving the trunnions 10 of the ribs. Said trunnions are axially locked in their bearings by means of covers 16 and spring disks 17, which hold the ribs in the positions imparted thereto by the chain running over the same. Suitable spring grease cups may be provided on said covers.

Figure 4:
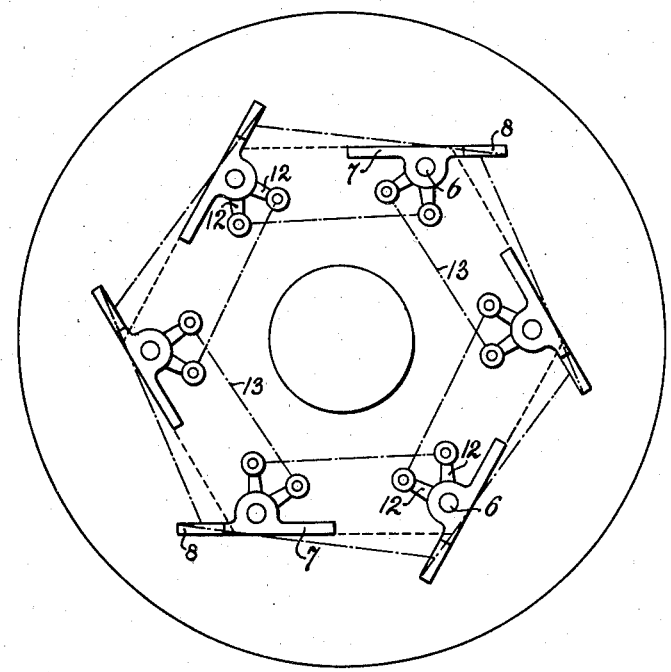
Fig. 4 is a diagram showing the manner in which the pivotally mounted ribs may be interconnected by a lever system, ensuring the correct and simultaneous adjustment of all ribs.

The diagram in Fig. 4 shows a construction in which the ribs 7, 8 are interconnected by rods 13 pivoted at either end to arms 12 on the ribs, so that angular movement of one rib results in an equal angular movement of all other ribs.

It will be understood that with a chain which is not liable to heavy wear and of which the pitches always remain substantially equal the one to the other, the rotatable ribs may be provided with suitable means whereby they can be locked in any predetermined angular position. In chains, however, that have only partly been renewed, the pitch between the links of one pair will, as a rule, appreciably differ from that between the links of another pair, and in such case it is a positive advantage for the ribs to have freedom of automatic and independent adjustment.

It will further be appreciated that my novel construction does away with the necessity of providing for wearing plates and consequently, of interrupting the operation of the dredger or the like for renewing said plates, as long as the self-adjustment of the rotatable ribs can keep pace with the wear and tear of the chain and of the ribs themselves. Moreover, this wear and tear is not nearly so great as it is in known constructions.

What I claim is:

1. In combination, a sprocket chain having a plurality of links and pivotal connections between said links, a sprocket wheel comprising a plurality of rotatable teeth, each tooth having a projection engageable with said pivotal connection and a flat surface engageable with said links, the engagement of said surfaces with said links causing said surfaces to define a portion of a polygon.

2. A sprocket wheel comprising a plurality of rotatable toothed members pivoted to rotate about axes parallel to the wheel axis, each toothed member comprising a cylindrical trunnion, a recessed portion therein adapted to engage the links of a chain, and a projection adapted to engage the pivotal connections of said links.

3. In combination, a sprocket chain having a plurality of links and transverse pivotal connections connecting said links, a sprocket wheel comprising a plurality of rotatable teeth, each tooth having a flat surface engageable with said links and a projection engageable with said pivotal connections, said links engaging said flat surfaces to cause said surfaces to define a portion of a polygon, and means interconnecting said teeth to cause said teeth to rotate together.

CHARLES H. van HASSELT.